United States Patent [19]

Amidzich

[11] Patent Number: 5,092,395
[45] Date of Patent: Mar. 3, 1992

[54] COOLING OR WARMING A BEVERAGE CONTAINER

[75] Inventor: Bradford G. Amidzich, Delafield, Wis.

[73] Assignee: Kantec Manufacturing, Inc., New Berlin, Wis.

[21] Appl. No.: 433,769

[22] Filed: Nov. 9, 1989

[51] Int. Cl.⁵ .................... B60H 3/04; A47K 1/08
[52] U.S. Cl. .................... 165/41; 165/80.1; 248/311.2; 248/315; 62/239; 62/244; 62/371; 62/377
[58] Field of Search .............. 165/41, 80.1; 62/239, 62/244, 371, 377; 248/311.2, 315

[56] References Cited

U.S. PATENT DOCUMENTS

| | | |
|---|---|---|
| D. 226,623 | 4/1973 | Shuford . |
| D. 259,835 | 7/1981 | Page, Jr. . |
| D. 264,525 | 5/1982 | Page, Jr. . |
| 2,289,701 | 7/1942 | Engel et al. ............. 248/311.2 |
| 2,370,822 | 3/1945 | Taurman et al. ......... 248/311.2 |
| 2,451,923 | 10/1948 | Cox et al. ............... 248/311.2 |
| 2,456,535 | 12/1948 | Rundell .................. 248/311.2 |
| 2,678,184 | 5/1954 | Erdody ................... 248/311.2 |
| 2,698,155 | 12/1954 | Bowman . |
| 2,763,413 | 9/1956 | Felton .................... 248/311.2 |
| 3,021,106 | 2/1962 | Kramer ................... 248/311.2 |
| 3,104,040 | 9/1963 | Stevens .................. 248/311.2 |
| 3,410,337 | 11/1968 | Priest . |
| 3,505,830 | 4/1970 | Koerner . |
| 3,532,318 | 10/1970 | Lloyd . |
| 3,757,851 | 9/1973 | Marble . |
| 3,850,006 | 11/1974 | Redfern et al. . |
| 3,858,405 | 1/1975 | Manzke . |
| 3,916,639 | 11/1975 | Atkinson . |
| 4,009,810 | 3/1977 | Shook .................... 248/311.2 |
| 4,022,599 | 5/1977 | Wilson et al. . |
| 4,103,510 | 8/1978 | Hall . |
| 4,258,555 | 3/1981 | Scharm et al. . |
| 4,324,381 | 4/1982 | Morris ................... 248/311.2 |
| 4,368,622 | 1/1983 | Brooks . |
| 4,441,638 | 4/1984 | Shimano ................. 248/311.2 |
| 4,478,052 | 10/1984 | McDowell . |
| 4,505,448 | 3/1985 | Massie . |
| 4,548,375 | 10/1985 | Moss . |
| 4,557,452 | 12/1985 | Khuong .................. 248/341.2 |
| 4,606,523 | 8/1986 | Statz et al. . |
| 4,629,153 | 12/1986 | Marcum . |
| 4,634,089 | 1/1987 | Wright et al. . |
| 4,653,289 | 3/1987 | Hodgetts . |
| 4,655,425 | 4/1987 | Wallace et al. .......... 248/311.2 |
| 4,779,831 | 10/1988 | Anderson . |
| 4,784,360 | 11/1988 | Mok ...................... 248/311.2 |
| 4,821,529 | 4/1989 | Maier . |
| 4,852,843 | 8/1989 | Chandler ................ 248/311.2 |
| 4,892,137 | 1/1990 | Bibik, Jr. . |
| 4,892,138 | 1/1990 | Bibik, Jr. . |
| 4,896,858 | 1/1990 | Sokolski et al. ......... 248/311.2 |
| 5,012,654 | 5/1991 | Gatti ..................... 62/371 |

FOREIGN PATENT DOCUMENTS

| | | |
|---|---|---|
| 596543 | 4/1934 | Fed. Rep. of Germany . |
| 1232487 | 10/1960 | France ................... 248/311.2 |
| 107302 | 11/1924 | Switzerland ............. 248/311.2 |

*Primary Examiner*—John Ford
*Attorney, Agent, or Firm*—Willian Brinks Olds Hofer Gilson & Lione

[57] ABSTRACT

An apparatus for cooling or warming a beverage container positioned in a flow of conditioned (cooled or warmed) air from a ventilation outlet. The apparatus includes a beverage container holder portion having a brace portion to clasp a beverage container and an attaching member portion that together are configured to position the beverage container in the flow of air from the ventilation outlet. A flexible cover can be used optionally with the beverage container holder portion and attaching member portion to direct and circulate air around a beverage container. Moreover, the cover provides a convenient place for the display of logos or advertising.

10 Claims, 2 Drawing Sheets

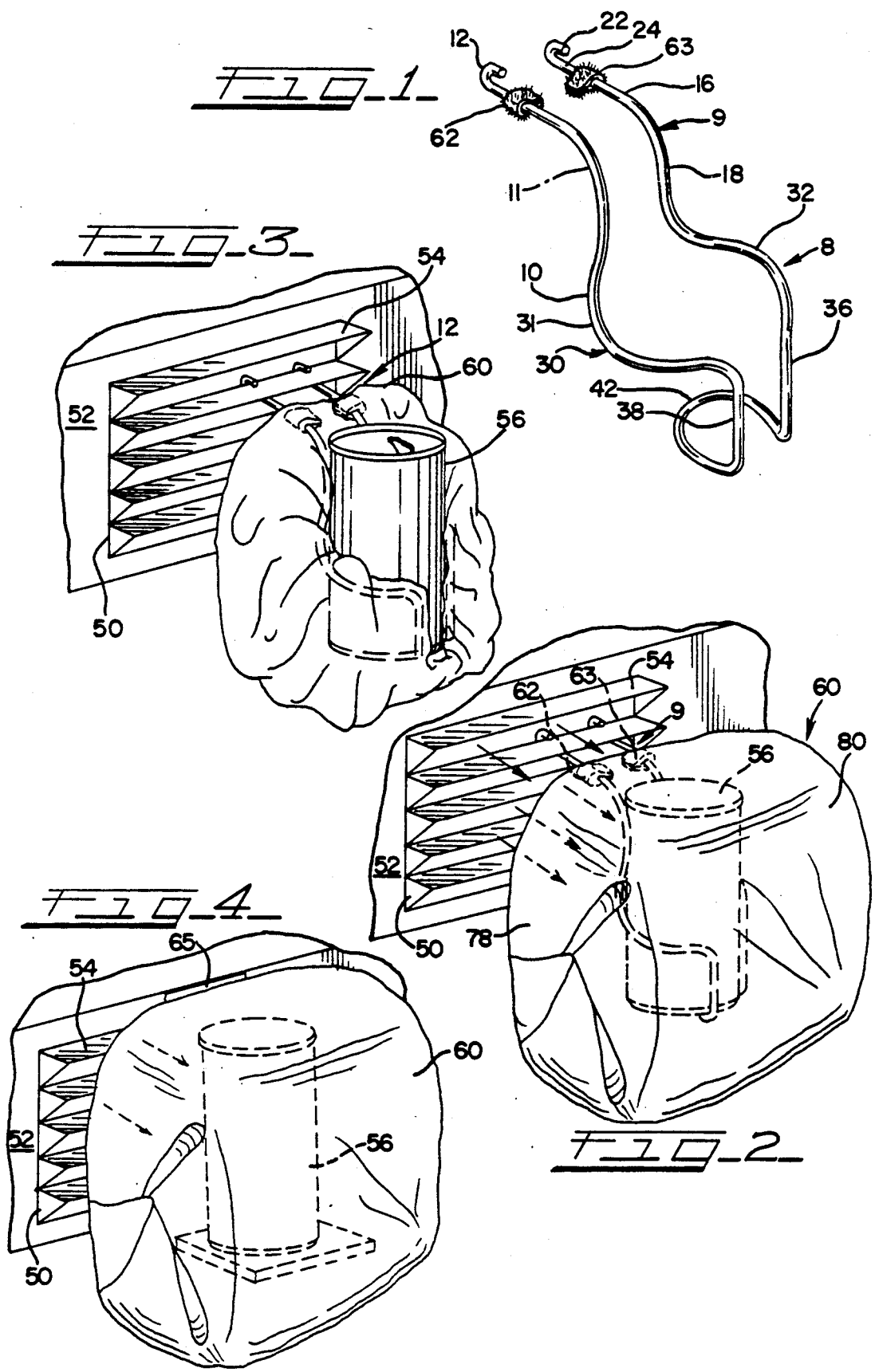

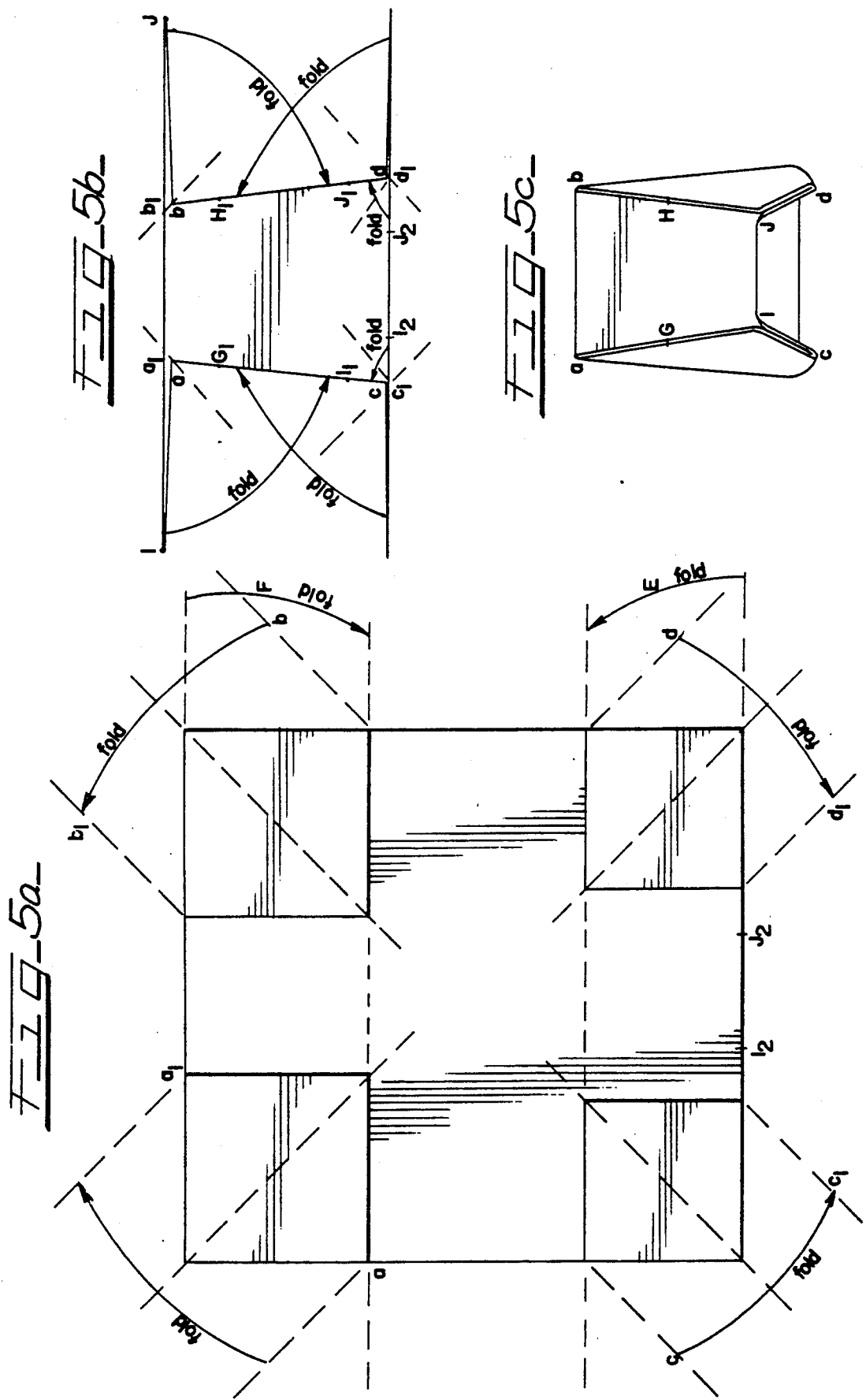

COOLING OR WARMING A BEVERAGE CONTAINER

FIELD OF THE INVENTION

This invention relates to beverage container holders in general, and in particular to apparatus for cooling and warming beverages. The invention further relates in general to a support structure for advertising or promotional indicia which incorporates such features.

BACKGROUND OF THE INVENTION

The consumption of beverages in automobiles is very common, so much so that automobile manufacturers typically provide beverage holders as part of the standard design of automobile interiors. In addition, numerous devices are available in the aftermarket for holding a beverage container in an automobile (truck or other vehicle) and preventing the container from spilling.

Devices are known that use an automobile's air-conditioning and heating systems to cool or warm food including beverages, such as those described in U.S. Pat. Nos. 3,757,851; 3,505,830; and 3,916,639. Unfortunately, many such devices are bulky and require permanent or semi-permanent attachment to the automobile's air-conditioning or ventilation system, and take up considerable space in the automobile.

A prior device suitable for cooling (or warming) a single beverage is described in U.S. Pat. No. 4,653,289. The '289 device includes a ventilator cover with a nozzle to which is attached a rigid receptacle structure in which a beverage container such as a can of pop may be housed. A drawback of the '289 device is that because beverages come in a variety of differently sized containers, larger containers, such as glass or plastic bottles or coffee mugs with handles, will not fit in the receptacle of '289. Moreover, small sized containers may slide around inside the receptacle, spilling or jostling the contents. Such problems are particularly acute if the beverage is carbonated.

Another drawback of the '289 device, as well as others of the known devices, is that the device requires that a ventilator cover with nozzle be attached to the ventilation outlet. Such a cover may not be adaptable to certain automobiles due to wide differences in the size and design of air conditioning outlets and surrounding dash areas. In addition, attachment of the ventilation cover of '289 prevents subsequent adjustment of the ventilation louvers. Also some people may find the permanent attachment of such a ventilator cover to be aesthetically displeasing.

Still another drawback of the '289 device is its lid section. Although the '289 patent teaches that the lid is optional, it is clear that the efficiency of the receptacle would be diminished by omission of the lid. When the beverage is sufficiently cooled by the '289 device, the lid must be removed in order to consume the beverage. The '289 patent does not disclose what to do with the lid while the beverage is being consumed.

Further, the '289 device is relatively complicated to manufacture, has a relatively large number of parts, is relatively difficult to install and may be awkward to use, especially when driving.

Related to the subject of beverage consumption is advertising. It is often desired to provide consumers with promotional items which beneficially present advertising, logos, or other promotional or aesthetic indicia to the consumer. The desired effect of such promotional articles is enhanced where the indicia are frequently visible, and where the effect is heightened by association with a benefit to the consumer. For a beverage sold in containers, the ideal time to present promotional indicia is when the consumer desires to consume such a beverage.

Accordingly, it is known to provide such indicia on articles used in conjunction with beverage consumption, such as bottle openers, glasses, or insulating sleeves. Unfortunately, such items often have only a limited space to support the desired indicia, or curved or otherwise distorted surfaces that degrade the indicia. Many such items have little or no value to the consumer, or are not practical for use in automobiles where indicia might otherwise be visible repeatedly for extended periods.

A beverage cooling accessory that is present before a driver or passengers for extended lengths of time has considerable potential as an advertising medium, and thus ideally may be steeply discounted or even given away as a promotional item. Unfortunately, prior art devices for heating or cooling beverages in automobiles and the like have little utility as advertising media. For example, the '289 aforementioned device has a shape that is not particularly well suited for advertising. The '289 device conforms to the general shape of a can, i.e., cylindrical. A curved cylindrical surface is not so readily adaptable as a flat or rectangular surface for advertising indicia, promotional logos, or other marketing messages.

Therefore an object of the present invention is to provide a device to hold a beverage in an automobile and to cool or warm it efficiently. It is a further object to provide a means for cooling or warming a beverage in a room, such as an office, dormitory, bedroom or hotel room, without a refrigerator or heating element.

Another object of the present invention is to provide a novel support for advertising or promotional indicia which will provide the user with the advantages discussed above. In particular, it is desired to provide an inexpensive, mass-producible beverage holder including a support surface, such as a hood, which may be printed with desired promotional indicia and which will be visible to the user when beverages are cooled (or warmed) and consumed.

These and other objects of the present invention will become apparent to those skilled in the art from the following specification when read in light of the attached drawings.

SUMMARY OF THE INVENTION

An apparatus for positioning a beverage container in a flow of conditioned (cooled or warmed) air from a ventilation outlet is provided so that the beverage is cooled or warmed by the conditioned air. The apparatus includes a beverage container holder portion having a brace portion and an attaching member portion, which together are configured to position the beverage container in the flow of air from the ventilation outlet. The beverage container holder portion and the attaching member portion may be separate parts or together may form a single integral unit.

According to another feature of the present invention, a flexible cover is provided. The cover directs and circulates air from the ventilation outlet around a beverage container that may be retained in a holder that is part of the invention or may otherwise be retained or positioned in the flow of air from the ventilation outlet. The flexible cover allows for more efficient cooling or warming of the beverage in the container, and provides numerous additional benefits as described more fully herein. The cover also provides a place for the display of logos or advertisements.

BRIEF DESCRIPTION OF THE DRAWINGS

FIG. 1 is a perspective view displaying features of one embodiment of the present invention.

FIG. 2 is a perspective view of another embodiment of the present invention depicted with a beverage container retained therein in front of a ventilation outlet in an automobile.

FIG. 3 is a perspective view of the embodiment depicted in FIG. 2 with a beverage container retained outside of the cover.

FIG. 4 is a perspective view of still another embodiment of the present invention.

FIGS. 5a, 5b and 5c show a folding pattern for the cover depicted in FIGS. 2 and 3.

DESCRIPTION OF THE PRESENTLY PREFERRED EMBODIMENTS

A preferred apparatus according to the invention is illustrated in FIG. 1. The apparatus comprises a beverage container holder portion 8 integrally connected to an attaching member portion 9. Both the beverage container holder portion and the attaching member portion g are formed of a metal frame 10. Most preferably, frame 10 is a single piece of springy resilient metal wire, such as brass, e.g. "260 Brass half-hard", having a diameter of approximately 3/32 inches. Alternately, the beverage container portion 8 and the attaching member portion 9 may be separate pieces that are connected to form the apparatus. In addition to metal, the beverage container portion and the attaching member portion each may be made of plastic, rubber, fiberglass, a plastic coated metal, or from a combination of more than one such material.

A wire frame of brass or other metal is preferred because it provides a number of unique advantages. It is relatively lightweight, inexpensive, and use of materials is minimized. Also, metal wire is an easy and familiar material with which to work and forming of the wire frame can readily be adapted to a relatively inexpensive metal working process. By providing a wire frame which is bendable and formable, a user can readily bend or shape various elements of the frame to adapt it to fit a variety of different ventilation outlets, which is typically not possible with known devices. Also, a deformable wire frame is unlikely to be hazardous if the automobile is involved in an accident.

The attaching member portion 9 serves to position the beverage container holder portion 8 in the flow of air from a ventilation outlet. Referring again to FIG. 1, attaching member portion 9 comprises an angled shank portion 11 that terminates in a hook end 12. The attaching member portion 9 may take alternative embodiments. For example, attaching member portion may be a hook-and-loop type strip (such as a Velcro brand strip), an adhesive strip, a latch, a suction-type device, or a bracket or the like. The attaching member is preferably removable but is not necessarily so.

In the preferred embodiment, the present invention "hangs" by the hooked end 12 from the cross member of the ventilation outlet. The weight of the beverage container holder portion 8 and the attaching member portion 9 (and beverage container if present) is sufficient to keep the present invention in place positioned in front of the ventilation outlet. The hook end 12 provides the advantage that the present invention is readily removable from the ventilation outlet. Removal may be desired to facilitate cleaning of the automobile or beverage container holder, or to move the present invention to another location, such as into another automobile or into an office. Moreover, in contrast to the '289 device discussed above, the present invention can easily be removed in order to allow adjustment of ventilation louvers.

Angled shank portion 11 includes upper shank 16 and lower shank 18 forming an angle between them that may be a right angle or an angle greater than 90°. In this embodiment the angle between upper shank 16 and lower shank 18 is approximately 115°. However, inasmuch as the attaching member portion 9 is preferably made of the springy resilient material of the frame 10, it can easily be bent and adapted by the user for the dimensions where the present invention will be used.

Upper shank portion 16 terminates in hook end 12 that has a return 22 defining a slot 24. Slot 24 is sized and adapted for engaging a cross member of a ventilation outlet. The cross member would typically be a adjustable louver such as in an automobile air conditioner ventilation outlet. In the most preferred embodiment, the attaching member portion 9 is approximately 5 inches long and the upper shank 16 and lower shank 18 are each approximately 2½ inches long. The hook end return 22 is approximately ¼ inch long defining the slot 24 which is approximately ¼ inch for engaging the cross member of the ventilation outlet.

In the preferred embodiment, the attaching member portion is formed of and is a part of the same metal frame that forms the beverage container holder portion. This provides several advantages, such as simplified construction of the present invention, thereby minimizing manufacturing costs for both materials and forming.

The lower shank 18 of attaching member portion 9 connects to the beverage container holder portion 8. In the preferred embodiment, beverage container holder portion 8 includes brace portion 30 for clasping the beverage container. In the preferred embodiment, brace portion 30 comprises a pair of near semi-circular braces 31 and 32 formed of the springy resilient metal frame 10. However, brace portion 30 may be of a different shape or configuration or of different materials. Brace portion 30 connects to vertical members 36 and 38 which may also preferably be formed of frame 10. In turn, vertical members 36 and 38 connect to platform 42 which may also be formed of frame 10.

The brace portion 30 and vertical members 36 and 38 are sized to accommodate a beverage container. Typically, such containers have a range of diameters from 2½ inches to 4 inches However, this range can easily be expanded by appropriately bending and forming the frame 10. In contrast to prior devices such as the '289 device, beverage containers such as soda pop cans or bottles made of metal, glass, or plastic, and coffee cups made of glass, plastic, metal or ceramic, can easily be accommodated in beverage container holder portion 8. The gap between vertical members 36 and 38 advantageously may accommodate a handle on the container, such as a coffee cup handle.

Platform 42 serves the function of preventing a beverage container from sliding out the bottom of brace portion 30. In the most preferred embodiment, vertical members 36 and 38 are approximately 2¼ inches long and the platform has a near circular shape with a diameter of approximately 1½ inches. Although shown to be near circular in this embodiment, platform 62 may be any shape. However, the near circular shape shown in FIG. 1 provides a adequate dimension to support the bottom of a typical beverage container as well as to impart springy resiliency to the frame 10. In the preferred embodiment, the near circular shape of the platform 42, vertical members 36 and 38, and the semi-circular braces 31 and 32 define a conical shape that is springy and resilient as well as aesthetically pleasing.

To install the apparatus of the invention into a ventilation outlet, such as that of an automobile, the attaching member portion 9 is inserted into the ventilation outlet and engages it. In the preferred embodiment, hook ends 12 can be inserted between louvers in the automobile's ventilation outlet and hooked upon a louver to hold the present invention in place. Because this embodiment of the present invention is formed of frame 10 which is preferably springy and resilient, hook ends 12 can be squeezed together for insertion between louvers of a ventilation outlet. If necessary, this embodiment of the present invention can be rotated (for example, 90°) and the hook ends 12 squeezed together to insert between louvers of the ventilation outlet.

In the preferred embodiment, the elongated hook ends 12 are also formed of the springy, resilient frame 10 and may be bent to adjust to the specific dimensions of the ventilation outlet. For example, because louvers in automobile ventilation outlets are usually horizontal, the hooked end returns 22 are preferably vertical in orientation. However, if the louvers of the ventilation outlet are vertical in orientation, the returns 22 may be bent into a horizontal orientation to engage vertical cross members.

The hook ends 12 should preferably be inserted into the ventilation outlet near the top of the ventilation outlet so that the beverage container is positioned in front of the ventilation outlet or slightly below it. The angle of upper and lower shanks 16 and 18 can be adjusted to improve the circulation of air around the beverage container.

After the present invention is attached in front of a ventilation outlet, a beverage container can be placed therein in beverage container holder portion 8. Cool or warm air from the ventilation outlet will be directed to pass over the beverage container. When a beverage, such as a can of soda pop, is placed in the flow from a car air conditioner, the beverage cools.

In further embodiments of the present invention, a flexible cover is attached proximate to the ventilation outlet to direct and circulate air from the outlet to and around a beverage container retained proximate to the outlet. Referring to FIG. 2, a embodiment is shown attached in front of a ventilation outlet 50 in dashboard 52 of an automobile. A cross member 54 (which may be an adjustable louver) is engaged by attaching member portion 9 (which may include hook ends 12). A beverage container 56 is depicted (by dashed lines) positioned in front of the ventilation outlet by the present invention.

This embodiment includes a frame which is preferably the same as the frame depicted in FIG. 1, and a flexible beverage container cover 60. Referring to FIG. 2, the flexible cover substantially surrounds the beverage container holder and the beverage container retained therein. Cover 60 is sized to envelop the beverage container retained in beverage container holder portion 8 and allow the circulation of air around the beverage container. Preferably cover 60 is attached to the holder portion or the attaching member portion by fasteners such as hook-and-loop type fasteners 62 and 63, shown in FIGS. 1 and 2. In this embodiment, the flexible cover 60 is attached to the upper shank portions 16. Other types of fasteners such as dot snappers, buttons, or clips may also be used.

Alternatively, cover 60 may be attached directly to the vehicle proximate to and preferably above outlet 50, such as by fasteners adhesively attached to the dash. Such installation may be desirable when ventilation outlet 50 includes vertical louvers such that the majority of the frame lies below the vent. In such cases, attaching the flexible cover 60 directly to the dash at a higher location may result in more conditioned air flow into the cover, and thus enhanced performance. In yet another embodiment, the cover may be attached directly to the dash and may also serve as the beverage container holder portion. By including suitable stiffening members, such as ribbings interior to the cover, the cover can be adapted to retain the beverage container as well.

In use, cover 60 is lifted, although it may still be attached by fasteners 62 and 63. A beverage container is placed in the beverage container holder portion and the cover 60 is positioned over both the beverage container holder portion 8 and beverage container as shown in FIG. 2. Cover 60 may be tucked around the bottom of frame 10 so that it stays in place.

Cover 60 has an open side oriented toward the ventilation outlet. When air leaves the ventilation outlet, it fills cover 60. When filled with air, a preferred embodiment of the cover has a generally rectangular shape approximately 8 inches wide, 8 inches high and 4 inches deep. In a typical automobile, cool air-conditioned air from a ventilation outlet is approximately 40°-50° F. This cool air circulating around the beverage container inside cover 60 cools the beverage in the beverage container to approximately 40°-50° F. in approximately 4-10 minutes. Of course, the rate of cooling and ultimate temperature depend upon the initial temperature of the beverage, the size and density of the beverage, and the size, efficiency, and setting of the air conditioner, among other factors. The cooling or warming is enhanced by the gentle jostling of the beverage container contents from the motion of the automobile.

After the beverage is at the desired temperature, the cover is again lifted and the beverage container 56 removed from the beverage container holder portion 8. The beverage container 56 (and the beverage in it) are now cool or warm and may be consumed. The beverage container 56 may be inserted back into the beverage container holder portion 8, this time with the flexible cover optionally located between the beverage container 56 and the beverage container holder portion 8, such as shown in FIG. 3. When a beverage container 56 is retained in the present invention in this manner, cover 60 is tucked between the frame 10 and the beverage container 56, thereby enhancing a snug fit for the beverage container 56. Cover 60 may be absorbent to catch any condensation on beverage container 56. In contrast to previous devices, this embodiment of the present invention provides a convenient place to store the cover while the beverage is being consumed, is simple to use, and does not distract the driver.

The cover is preferably made of a fabric, such as a cotton, canvas, a synthetic, or a blend of one or more of these materials, although non-woven materials such as mylar or plastic sheeting may be used. A woven fabric such as cotton is preferred for its low cost, ease of fabrication, absorbency, and for its ability to allow controlled diffusion of conditioned air throughout its semi-porous surface.

In another embodiment, the flexible cover is attached proximate to the ventilation outlet to direct and circulate air from the outlet to and around a beverage container retained proximate to the outlet by means other than a beverage container holder and attaching member portions included with the present invention. Such an embodiment is depicted in FIG. 4. Some automobiles provide a shelf, tray, ledge, or other means 64 suitable for retaining a beverage container proximate to the ventilation outlet. Where such a retaining means is already provided, the flexible cover may be attached directly to the dash proximate to an outlet by an attaching means such as adhesive strip 65. This embodiment is used in a manner similar to that described above.

Referring again to FIG. 2, at those times when the beverage container is in the beverage container holder portion 8 and both are inside the cover 60, the flexible cover 60 will typically billow under the increased pressure of conditioned air supplied by the automobile's blower. Cover 60 is preferably folded from a square section of fabric to form a box-like shape (such as shown in FIG. 2) having an open side directed toward the ventilation outlet. In this embodiment, it is preferred that the cover has more rigidity in the sides 70 than to the rest of the cover. This may be accomplished by the use of additional layers of folded fabric or by stiffening members such as ribbing. Such stiffening of the sides enhances the shape of the cover and also tends to provide an adequately flat surface for cover front 80 which may be used for advertising messages, trademarks, logos of organizations such as universities, and other art work. Although a generally rectangular shape is readily adaptable for the presentation of advertising, the cover could be different shapes which themselves might be suggestive of a promoted item, e.g., a tire shape or a hamburger shape for the advertising of tires or hamburgers.

A preferred folding pattern for the cover is depicted in FIGS. 5a, 5b, and 5c. FIGS. 5a, 5b, and 5c show a rectangular piece of fabric that may be used for the cover, preferably approximately 16×16 inches. To form a preferred one-piece side reinforced folded hood or cover, fold and tack or connect (a to $a_1$), (b to $b_1$), (c to $c_1$), (d to $d_1$). Next, fold E in combination with H and $H_1$ and tack. Then, fold E in combination with G and $G_1$, and tack. Then, fold F in combination with (I to $I_1$) and ($I_2$ to $I_1$), and tack. Finally, fold F in combination with (J to $J_1$) and ($J_2$ to $J_1$), and tack. Tacks or connections may be formed by any suitable means, such as sewing, adhesives, studs or, in the case of meltable materials, heat. This folding pattern is particularly suitable for use in making the cover for the present invention because it minimizes cutting and waste of the fabric while at the same time imparting rigidity to the sides of the rectangular cover. This folding pattern represents only one possible alternative for the cover; other suitable patterns can be envisioned.

The present invention may be used for either cooling or warming a beverage and may be used in cars, homes, offices, dormitories, hotels or any place provided with forced air type heating and air-conditioning systems. With the present invention, a person does not need a refrigerator or heater for cooling or warming beverages and does not have to rely on obtaining cool or warm beverages from vending machines.

Additional units of the present invention may be used in front of other ventilation outlets in an automobile for cooling or warming several beverages at the same time, such as for other passengers in the automobile.

The foregoing description of the presently preferred embodiments of the present invention has been offered for purposes of illustration and description. It is not intended to limit the scope of the invention, which is defined by the appended claims and their equivalents. Various modifications and variations of the preferred embodiments are possible in light of the above teachings and will be apparent to persons skilled in art. Such modifications and variations do not depart form the spirit or scope of the invention and it is therefore intended that the scope of the invention be defined by the appended claims, including all equivalents.

I claim:

1. An apparatus for positioning a beverage container in the flow of air from a ventilation outlet for cooling or warming the beverage comprising:
   an attaching member portion operatively adapted for engaging the ventilation outlet,
   a beverage container holder portion connected to said attaching member portion for holding the beverage container,
   a flexible cover oriented and located with respect to the ventilation outlet to encompass entirely a beverage container held by said holder portion so that air from the ventilation outlet is directed to or around said beverage container holder portion by said cover, and
   further comprising means for releasably attaching said cover to said attaching member portion or said beverage container holder portion.

2. The apparatus of claim 1 in which said cover has an opening that can be oriented toward the ventilation outlet so that air from the ventilation outlet can be directed to said beverage container holder portion.

3. The apparatus of claim 1 further comprising a fastener means for releasably attaching said cover to said attaching member portion.

4. The apparatus of claim 3 in which said fastener means comprises a hook-and-loop type fastener.

5. The apparatus of claim 1 in which said cover is foldable whereby said cover can snugly secure a beverage container in said beverage container holder portion if said cover is between said beverage container holder portion and a beverage container, but can also billow and present an advertising message if said cover is not between said beverage container holder portion and a beverage container.

6. The apparatus of claim 5 in which said cover is absorbent.

7. An apparatus for positioning a beverage container in the flow of air from a ventilation outlet for cooling or warming the beverage comprising:
   an attaching member portion operatively adapted for engaging the ventilation outlet,
   a beverage container holder portion connected to said attaching member portion for holding the beverage container, and a flexible cover oriented and located with respect to the ventilation outlet to encompass a beverage container held by said holder portion, and in which said cover is billowable and inflates to an extended configuration under pressure of flow of air from said outlet.

8. The apparatus of claim 7 in which said cover has sides more rigid than the rest of said cover whereby said cover can present a generally rectangular shape suitable for supporting promotional indicia.

9. The apparatus of claim 7 in which said cover when inflated is approximately 8 inches wide, 8 inches high and 4 inches deep.

10. A beverage container holder comprising:
a springy wire frame comprising:
a platform,
one or more vertical members connected to said platform and extending vertically therefrom,
two opposed bracing members connected to said one or more vertical members said bracing members shaped to confine an object therebetween,
elongated hoods connected at one end thereof to said opposed bracing members opposite from the connection thereto of said one or more vertical members and at the opposite end thereof said elongated hoods operatively adapted for engaging a cross member of a ventilation outlet and hanging therefrom,
a flexible beverage container cover connected to said wire frame and oriented and located with respect to the ventilation outlet to encompass entirely a beverage container confined by said opposed bracing members, and
in which said flexible beverage container cover is releasably attachable to said frame and orientable with respect to the ventilation outlet so that air from the ventilation outlet is directed inside said cover through an open side thereof to circulate around the beverage container retained herein.

* * * * *